(12) United States Patent
Adler et al.

(10) Patent No.: US 9,189,372 B2
(45) Date of Patent: Nov. 17, 2015

(54) TRACE COVERAGE ANALYSIS

(71) Applicant: International Business Machines Corporation, Armonk, NY (US)

(72) Inventors: Yoram S. Adler, Haifa (IL); Eitan D. Farchi, Pardes Hana (IL); Orna Raz-Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 13/792,207

(22) Filed: Mar. 11, 2013

(65) Prior Publication Data

US 2014/0258991 A1 Sep. 11, 2014

(51) Int. Cl.
*G06F 9/44* (2006.01)
*G06F 11/36* (2006.01)

(52) U.S. Cl.
CPC .................................. *G06F 11/3676* (2013.01)

(58) Field of Classification Search
None
See application file for complete search history.

(56) References Cited

U.S. PATENT DOCUMENTS

| | | | |
|---|---|---|---|
| 7,028,290 B2* | 4/2006 | Srivastava et al. | 717/124 |
| 7,603,660 B2 | 10/2009 | Davia et al. | |
| 8,015,552 B1 | 9/2011 | Lindahl et al. | |
| 2008/0092123 A1* | 4/2008 | Davison et al. | 717/128 |
| 2008/0172655 A1 | 7/2008 | Davia | |
| 2009/0287729 A1* | 11/2009 | Chen et al. | 707/102 |
| 2011/0047532 A1 | 2/2011 | Wang | |
| 2012/0246625 A1* | 9/2012 | Puthuff | 717/130 |
| 2012/0317550 A1* | 12/2012 | Lindahl et al. | 717/128 |

OTHER PUBLICATIONS

Bergel et al., "Spy: A flexible code profiling framework", Computer Languages, Systems and Structures archive vol. 38 Issue 1, pp. 16-28, 2012.
Myers et al., "Using dynamic analysis to create trace-focused user interfaces for IDEs", FSE '10 Proceedings of the eighteenth ACM SIGSOFT international symposium on Foundations of software engineering, pp. 367-368, 2010.

* cited by examiner

*Primary Examiner* — Lewis A Bullock, Jr.
*Assistant Examiner* — Jacob Dascomb
(74) *Attorney, Agent, or Firm* — Noah A. Sharkan

(57) ABSTRACT

A method and apparatus for estimating coverage of a computer program from traces, the method comprising: receiving trace data generated by an execution of an executable unit; and estimating coverage of the executable unit from the trace data, wherein estimating coverage comprises estimating trace coverage.

12 Claims, 3 Drawing Sheets

TRACE COVERAGE ANALYSIS

TECHNICAL FIELD

The present disclosure relates to coverage analysis of computer programs in general, and to code coverage analysis of source code in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in devote a significant portion, such as 70%, of the development cycle to discover erroneous behaviors of the software employing the computerized device.

In order to determine that a testing phase is of a relatively high quality, coverage analysis may be utilized. By analyzing coverage of tests, a developer or any other user interested in testing the software, such as for example a member of a Quality Assurance (QA) team, may be informed which aspects or parts of the software have been sufficiently tested by the executed tests, and which aspects or parts have not.

Various different coverage metrics may be employed, such as but not limited to code coverage metrics, functional coverage metrics and data coverage metrics.

Code coverage describes the degree to which the source code of a program has been tested. Code coverage metrics are associated with portions of the software, and are indicative of whether specific portions of the code have been executed and tested. Code coverage may refer to execution of a statement, line, a function, code within a file, code of files in a directory, code associated with an object, code associated with a method of an object or the like.

BRIEF SUMMARY OF THE INVENTION

One exemplary embodiment of the disclosed subject matter is a computer-implemented method performed by a computerized device, comprising: receiving trace data generated by an execution of an executable unit; and estimating coverage of the executable unit from the trace data, wherein estimating coverage comprises estimating trace coverage.

Another exemplary embodiment of the disclosed subject matter is an apparatus having a processing unit and a storage device, the apparatus comprising: a trace receiving component for receiving trace data generated by an execution of an executable unit; and a coverage analysis component for estimating coverage of the executable unit from the trace data.

Yet another exemplary embodiment of the disclosed subject matter is a computer program product comprising: a non-transitory computer readable medium; a first program instruction for receiving trace data generated by an execution of an executable unit; and a second program instruction for estimating coverage of the executable unit from the trace data, wherein estimating coverage comprises estimating trace coverage, and wherein said first and second program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
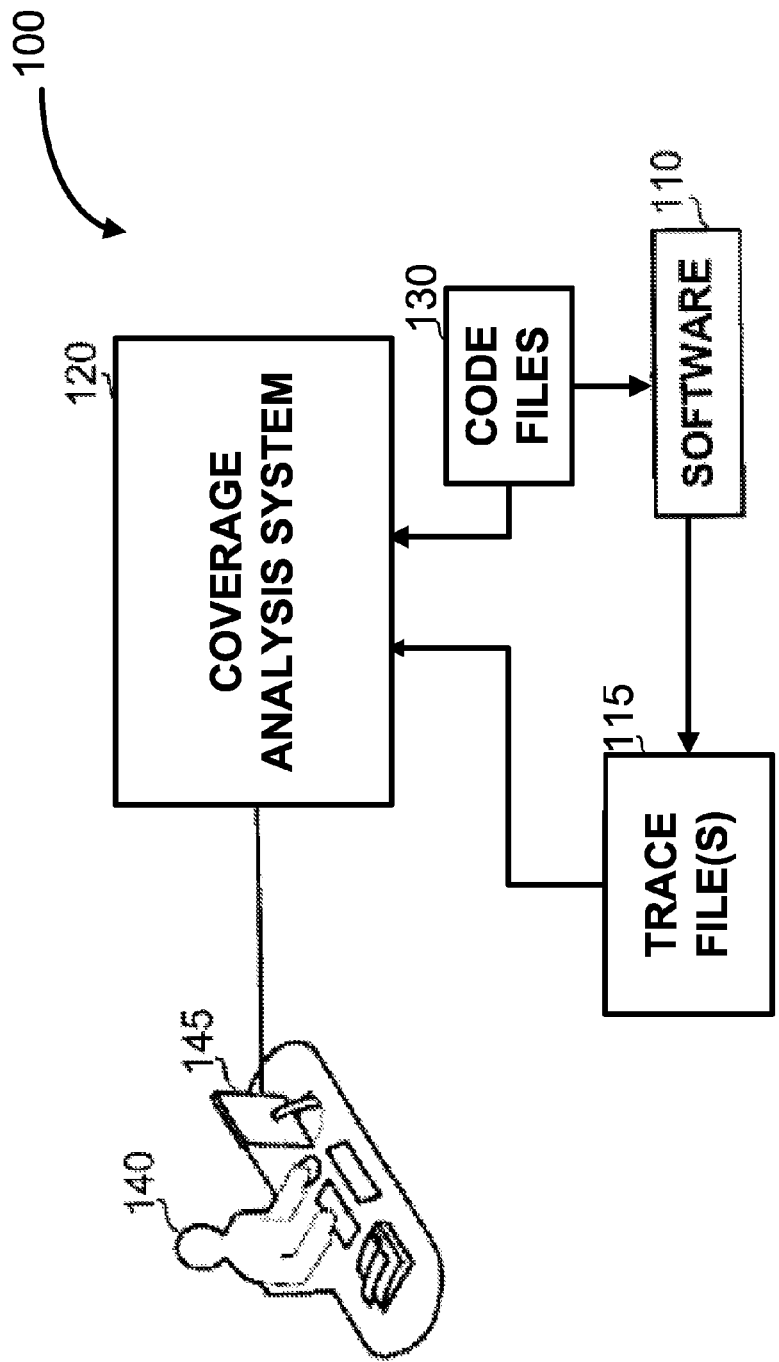
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is estimating trace coverage for computer programs, i.e., analyzing which part of the trace statements are executed in one or more executions, and which are not. Code coverage relates to identifying code elements of the software under test that are executed by tests during the software testing process. Code coverage may be measured by metrics such as method coverage, statement coverage, define-use coverage, decision coverage, or the like. Trace coverage generally relies on existing traces to extract coverage information and is thus related to code coverage but may or may not be identical to code coverage, depending on the distribution of trace statements in the code.

Another technical problem dealt with by the disclosed subject matter is the need for the analysis to be performed without substantially affecting performance of the analyzed computer program.

Some known methods and systems for code coverage may involve modification of the computer programs, such as for example by instrumentation. However, in many complex real world environments it may be very difficult or even impossible to gather code coverage data by instrumentation as it may not be possible to instrument the code to the required degree. Even further, instrumentation may affect performance of the computer programs when executed. In particular, performance may be affected in time-sensitive or timing-sensitive programs, such as multi-threaded programs in which different threads access the same memory locations, or the like.

Yet another technical problem dealt with by the disclosed subject matter is comparative analysis between different executions, in which the goal is to understand the differences in coverage between the executions.

One technical solution is to utilize traces or log files which are generated by many programs, for coverage analysis. Traces are generally intended to record hardware and software states, events, recording execution at a particular location dumps, and any kind of data that can assist in tracking a system execution error. Recording execution at a location may refer to a particular code line, or to a function or method entrance or exit, with or without their parameters or, Traces are often used for understanding unexpected behavior such as bugs or crashes.

By analyzing the trace files, optionally together with the code itself, trace coverage may be estimated. If the code is available, then trace coverage may be estimated, for example, by determining the number of locations executed (i.e., areas in the code executed in a particular execution), out of all the locations that comprise execution indications which may be obtained from analyzing the code, and interpreting this ratio as the trace coverage. However, even if the code is not available, traces of different executions, for example execution at the lab vs. execution at customer site may be compared and provide comparative coverage results.

By using traces that provide indications of entries to method or function, and estimating the number of executed methods out of all methods, method coverage may be estimated as well.

In addition to traces, printouts created by a user in the form of a code line indicating a constant or changing string to be output, may also be used with the traces as indications to executed code areas.

One technical effect of utilizing the disclosed subject matter is obtaining a trace coverage estimate in an easy to use manner, while utilizing data that already exists and is created without user intervention or with minimal user intervention, and without significant effect on the performance of the underlying program or execution environment. Using the trace data is also cost effective since it does not incur additional costs.

Another technical effect of utilizing the disclosed subject matter relates to obtaining method coverage, and comparative coverage between different executions.

Referring now to FIG. 1 showing a computerized environment in which the disclosed subject matter is used. A computerized environment 100 may comprise a coverage analysis tool 120. The coverage analysis tool 120 may be implemented as software executed by a computing platform, hardware, firmware, a combination thereof, or the like.

One or more code files 130 may be compiled, interpreted or otherwise used for generating software 110, also referred to a Software Under Test (SUT), but may also refer to firmware or other type of program.

Coverage analysis tool 120 may determine trace coverage of software 110 in accordance with one or more trace files 115 generated during one or more executions of software 110.

Coverage analysis tool 120 may also have access to code file 130, with or without debugging information.

A user 140, such as a member of a QA team, a developer or the like, may utilize coverage analysis tool 120 using a terminal 145, such as a laptop, a personal computer, or the like, to receive coverage information of software 110.

Figure 2:
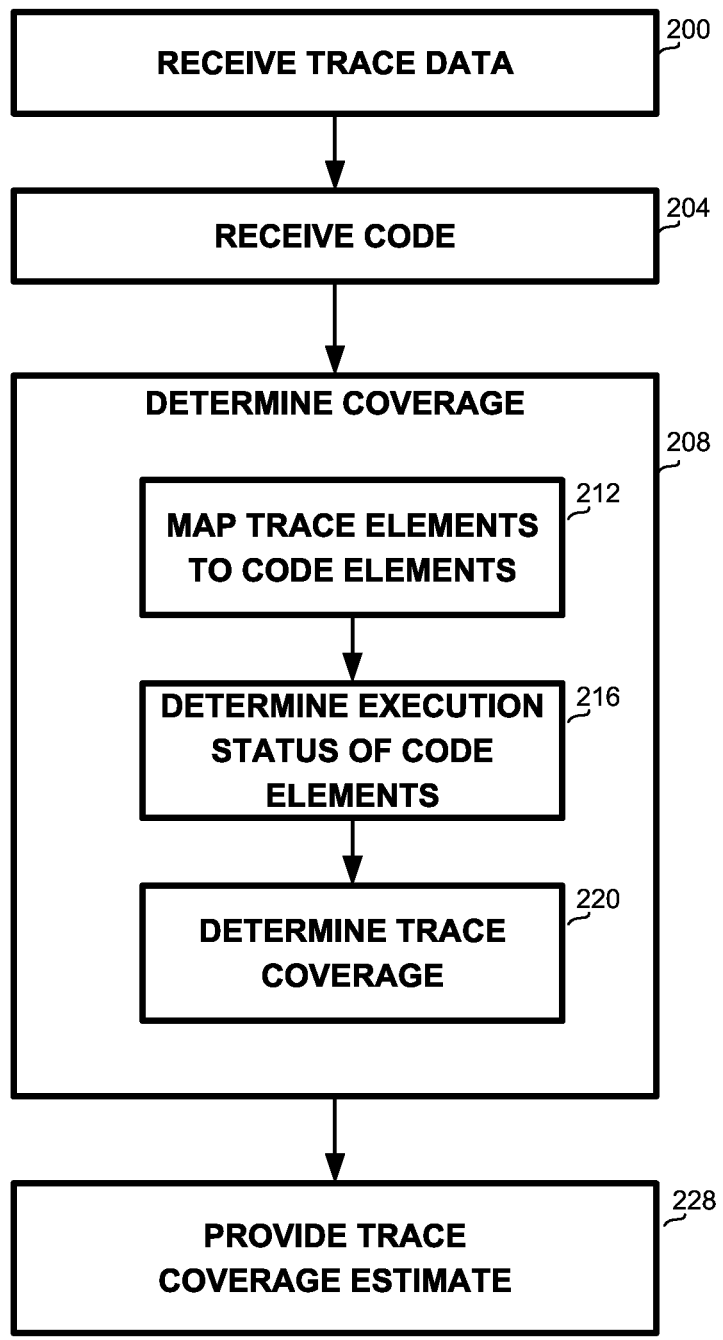
FIG. 2 shows a flowchart diagram of a method for trace coverage estimation, in accordance with some exemplary embodiments of the disclosed subject matter.

Referring now to FIG. 2, showing a flowchart of steps in a method for trace coverage determination.

On step 200, trace data related to or generated by one or more executions of one or more programs may be received. The trace data may be received in any format, such as text, binary, table, database, or the like. The trace data may comprise trace information generated automatically during execution, but may also comprise text output by the program due to user-programmed commands added to the code, usually for debugging purposes. In the disclosure below the trace data is assumed to be arranged in lines wherein each line is associated with a trace indication at a particular location in a code. It will be appreciated, however, that the description is not limited to such arrangements and that any other arrangement may be used.

On optional step 204, source code of the executed program may be received. The source code generally comprises code elements such as statements, functions or the like, which may be arranged in directories, files, methods, blocks or the like. In some embodiments, all the program source code may be provided while in other embodiments only some of it is provided, for example specific files or parts thereof for which trace coverage information is required. However, some analyses may be performed without any of the source code, thus step 204 is optional.

On step 208, the coverage of the software may be determined, for example by the following steps:

On step 212, trace elements, such as trace lines may be mapped to code elements, such as statements or methods that created or may have created them. Mapping may use coding and naming conventions that identify a tracing source code location. For example, a trace element indicating entrance to a method may comprise the names of the directory, file, class and method name, or the like. Thus, if the code file is available, a list of all source code locations that are capable of creating trace statements may be created.

Alternatively, if such conventions do not exist, all statements appearing in the trace files may be mapped to locations in the code. Some statements may be the result of trace or print commands which contain parameters and are therefore not fixed. For example, such command may print a constant string such as "In function A before loop", together with the value of a local or global variable, a field, or any other data.

Trace elements may be associated with such commands using for example the fixed part or the type of the variable part. Thus, each trace element may be associated with one command, or a number of possible commands which may have generated it.

This mapping may possibly be combined with smoothing over basic blocks that contain the executed source statements. For example, if one statement in a basic block is traced, all statements in the basic block may be indicated as executed, resulting directly from the definition of a basic block.

Then on step 216, each such code element which may generate a trace element may be associated with an execution status of: "executed" if positive mapping exists between the statement and a trace element; "not executed" if no mapping exists between the statement and a trace element; or "possibly executed" if the statement is a candidate for having generated a trace element (which may happen, for example, if some statements can output identical strings, in which case it may not be clear which one generated a particular trace element), wherein each such status is associated with a particular execution.

Then on step 220 trace coverage may be determined based on these statuses. The "possibly executed" status may be treated as executed, not executed, or get its own category. The category may even change over time, wherein in early development stages it may be treated as "executed", and later as "not executed" when higher coverage is required. The trace coverage may be determined, for example, by determining the ratio of the executed statements out of all the statements (relating to the statements that may have generated trace elements).

The mapping determined on step 212 may also be used for comparing multiple executions, for example under different stress factors, in the lab, at the customer site, or the like, so that the testing process may be improved.

Alternatively, if the source code is not available, two or more traces may be compared to obtain relative trace coverage.

In some embodiments, the trace coverage may be used for determining method coverage. In general, baseline estimate for code coverage is unavailable. Trace coverage may provide error path coverage, as it is intended to be used in debugging. Such coverage may not map directly to code coverage metrics such as statement, basic block, or method coverage. However, if the distribution of trace statements is such that substantially most methods generate tracing, trace coverage would be indicative of the method coverage.

On step 228 the trace coverage and possibly an estimation for method coverage may be provided, for example notified to a user, stored in a file or a database, presented in a visual or textual manner, or the like It will be appreciated that the trace coverage information may also be combined with information from a call graph of the software. The combination provides for providing partial path coverage information, e.g., which paths within the call graph paths were actually executed as indicated by the trace.

It will also be appreciated that the trace coverage information may be used for test selection. Each test may have traces associated with it. The trace coverage information may be extracted from given traces, and a subset of tests may be selected which covers the desired coverage goal, e.g., all coverage tasks as in the original set of tests.

It will be further appreciated that the method may be used also for extracting trace coverage from traces that were not specifically designed for extracting coverage information but rather designed for other purposes such as debugging, performance evaluation or the like. Extracting coverage information from such traces assumes the following: 1. traces not designed for extracting coverage data may contain noise, i.e., trace statements that are irrelevant for coverage e.g., statements that print success or error codes, and should therefore be discarded when evaluating coverage; and 2. Traces not designed for extracting coverage data may often include various types of information that can be treated as different types of traces. For example, a single trace statement may contain information related to trace coverage, as well as information related to error handling. Thus, each trace statement can be viewed as related to zero, one or more models, e.g., a coverage model and an error handling model. Thus, parts of such statements may be considered as projections of different models. Such handling may distinguish between statement parts related to different models, based on the provided definitions.

Thus, for a given trace entry, possible matches may be attempted which relate to different models. Some matches may relate to projections, e.g., selecting a few values of a few attributes, for example in testing recovery from error may relate to a certain computing platform running under a certain operating system. In evaluating coverage, code parts such as directory, file, etc. may be considered. Some trace statements or parts thereof may not relate to any of the models and may thus be considered "noise".

Thus, available traces may be used for additional purposes, such as coverage estimation, regardless of the initial purpose for which it was created.

Figure 3:
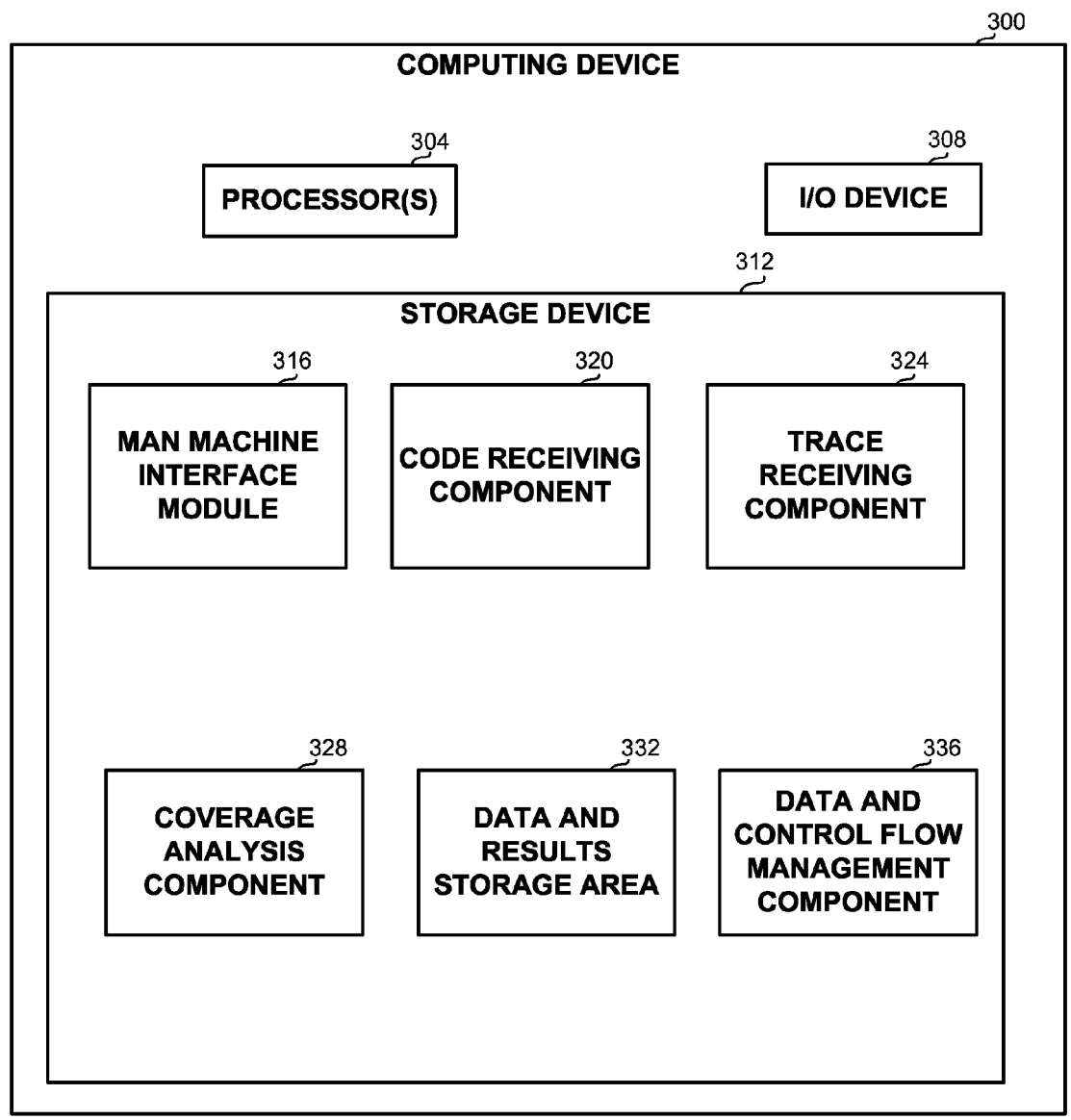
FIG. 3 shows a block diagram of a trace coverage estimation system, in accordance with some exemplary embodiments of the disclosed subject matter.

Referring now to FIG. 3 showing a block diagram of a coverage analysis system.

The system may comprise a computing device 300, which may comprise one or more processors 304. Any of processors 304 may be a Central Processing Unit (CPU), a microprocessor, an electronic circuit, an Integrated Circuit (IC) or the like. Alternatively, computing device 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by computing device 300 or any of it subcomponents.

In some embodiments, computing device 300 may comprise an input-output (I/O) device 308 such as a terminal, a display, a keyboard, a mouse, a touch screen, an input device or the like to interact with the system, to invoke the system and to receive results. It will however be appreciated that the system can operate without human operation and without I/O device 308.

Computing device 300 may comprise one or more storage devices 312 for storing executable components, and which may also contain data during execution of one or more components. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause any of processors 304 to perform acts associated with any of the steps shown in FIG. 2 above, for example analyzing trace files, mapping trace element to code elements, or others.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

In some exemplary embodiments of the disclosed subject matter, storage device 312 may comprise or be loaded with a man machine interface (MMI) module 316. MMI module 316 may be utilized to receive input or provide output to and from the system, for example receiving specific user commands or parameters related to the system, storing and retrieving information to and from a database, providing output, or the like.

Storage device 312 may optionally comprise code receiving component 320 for receiving one or more code files encompassing code of an executable unit such as a program, a module, a library or the like, adapted to generate trace files. The code may be in any programing language such as C, C#, C++, Java or others.

Storage device 312 may comprise trace receiving component 324 for receiving one or more files or streams comprising trace elements. Then if code was received by code receiving component 320, then the received trace elements may be generated by the executable unit associated with the code files received by code receiving component 320. The traces may be received in any format such as text, binary, table or the like.

Storage device 312 may comprise coverage analysis component 328 or estimating the coverage achieved by the executions which generated the received trace files. Coverage analysis component 328 may comprise components for mapping trace elements to code statements which may generate a trace element, and for determining the status of each such code statement, whether it was executed, not executed or may have been executed. Coverage analysis component 328 may also comprise trace coverage estimation components for determining the trace coverage provided by the execution which generated the trace, the coverage differences between two or more traces, or the like.

Storage device 312 may also comprise data and results storage area 332 for storing the data as received by code receiving component 320, trace receiving component 324 or parameters or other input provided by a user. Additionally or alternatively, data and results storage area 332 may store coverage results and intermediate results such as mapping between trace elements and code elements, or the like.

Storage device 312 may also comprise data and control flow management component 336, for managing the information and control flow among the detailed components. For example, data and control flow management component 332 may be responsible and comprise corresponding components for transferring code files received by code receiving component 320 and traces received by trace receiving component 324 to trace coverage analysis component 328, storing the results in storage area 332, or the like.

The method and apparatus may be used for analyzing trace data obtained by executing a program or another executable unit, for estimating the coverage provided by the execution. The method and apparatus utilize trace or log files which may have been generated for other purposes such as debugging or profiling. The method and apparatus are thus efficient and do not require manual labor on one hand, and do not significantly interfere with the program performance on the other hand.

It will be appreciated that given a functional model of the program, the method and apparatus may also be used for functional coverage estimation. In that case, rather than extracting code coverage elements such as directories, files and methods, the values of functional attributes will be extracted. For example, in a system related to a health care environment, the values may comprise patient ID, name or other identifier, disease code, treatment code, or the like. Using these values, functional coverage estimation may be performed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
   receiving trace data and non-trace data generated by an execution of an executable unit, the trace data comprising a plurality of trace elements and the non-trace data comprising string outputs;
   receiving source code corresponding to the received trace data, the source code comprising a plurality of source code elements that generate a trace element, wherein a subset of the source code elements generate the string outputs; and
   estimating coverage of the executable unit from the trace data, source code elements, and non-trace data, wherein estimating coverage comprises:
      mapping the plurality of trace elements to the plurality of source code elements;
      associating an execution status with each respective source code element, wherein source code elements having a positive mapping to a trace element are associated with a first execution status, source code elements having no positive mapping to a trace element are associated with a second execution status, and source code elements that output a string identical to another source code element are determined to be candidates for generating a trace element and are associated with a third execution status; and
      determining the estimated coverage based upon the mapping of the plurality of trace elements and the execution statuses, wherein the determining the estimated coverage comprises associating, based on a level of estimated coverage desired, the first execution status associated with source code elements having a positive mapping with the source code elements associated with the third execution status and determined to be candidates for generating a trace element.

2. The computer-implemented method of claim 1 wherein trace coverage is estimated as a ratio between executed code elements that comprise trace elements generation, and all code elements that comprise trace elements generation.

3. The computer-implemented method of claim 1, further comprising providing the trace coverage estimate to a user.

4. The computer-implemented method of claim 1, further comprising estimating method coverage from the trace coverage.

5. The computer-implemented method of claim 1, wherein estimating the trace coverage comprises estimating coverage differences between two executions of the executable unit.

6. The computer-implemented method of claim 1, further comprising combining the trace coverage with information selected from the group consisting of: a call graph, a data flow graph, and a control flow graph.

7. The computer-implemented method of claim 1, further comprising using the trace coverage for test selection.

8. The computer-implemented method of claim 1, further comprising using the trace coverage for estimating functional coverage.

9. The computer-implemented method of claim 1, further comprising determining portions of the trace data that are irrelevant for a coverage estimation.

10. An apparatus having a processing unit and a storage device, the apparatus comprising:
    a trace receiving component for receiving trace data and non-trace data generated by an execution of an executable unit, the trace data comprising a plurality of trace elements and the non-trace data comprising string outputs;
    a code receiving component for receiving source code corresponding to the received trace data, the source code comprising a plurality of source code elements that generate a trace element, wherein a subset of the source code elements generate the string outputs; and
    a coverage analysis component for estimating coverage of the executable unit from the trace data, the source code elements, and non-trace data, wherein estimating coverage comprises:
       mapping the plurality of trace elements to the plurality of source code elements;
       associating an execution status with each respective source code element, wherein source code elements having a positive mapping to a trace element are associated with a first execution status, source code elements having no positive mapping to a trace element are associated with a second execution status, and source code elements that output a string identical to another source code element are determined to be candidates for generating a trace element and are associated with a third execution status; and
       determining the estimated coverage based upon the mapping of the plurality of trace elements and the execution statuses, wherein the determining the estimated coverage comprises associating, based on a level of estimated coverage desired, the first execution status associated with source code elements having a positive mapping with the source code elements associated with the third execution status and determined to be candidates for generating a trace element.

11. The apparatus of claim 10, wherein the coverage analysis component estimates differences between two executions of the executable unit.

12. A computer program product comprising:
    a non-transitory computer readable medium;
    a first program instruction for receiving trace data and non-trace data generated by an execution of an executable unit, the trace data comprising a plurality of trace elements and the non-trace data comprising string outputs;
a second program instruction for receiving source code corresponding to the received trace data, the source code comprising a plurality of source code elements that generate a trace element, wherein a subset of the source code elements generate the string outputs; and
a third program instruction for estimating coverage of the executable unit from the trace data, source code elements, and non-trace data, wherein estimating coverage comprises:
mapping the plurality of trace elements to the plurality of source code elements;
associating an execution status with each respective source code element, wherein source code elements having a positive mapping to a trace element are associated with a first execution status, source code elements having no positive mapping to a trace element are associated with a second execution status, and source code elements that output a string identical to another source code element are determined to be candidates for generating a trace element and are associated with a third execution status; and
determining the estimated coverage based upon the mapping of the plurality of trace elements and the execution statuses, wherein the determining the estimated coverage comprises associating, based on a level of estimated coverage desired, the first execution status associated with source code elements having a positive mapping with the source code elements associated with the third execution status and determined to be candidates for generating a trace element, and
wherein said first, second, and third program instructions are stored on said non-transitory computer readable medium.

* * * * *